(12) United States Patent
Yavo et al.

(10) Patent No.: US 11,477,214 B2
(45) Date of Patent: Oct. 18, 2022

(54) CLOUD-BASED ORCHESTRATION OF INCIDENT RESPONSE USING MULTI-FEED SECURITY EVENT CLASSIFICATIONS WITH MACHINE LEARNING

(71) Applicant: Fortinet, Inc., Sunnyvale, CA (US)

(72) Inventors: Udi Yavo, Herzlia (IL); Roy Katmor, San Francisco, CA (US); Ido Kelson, Tel-Aviv (IL)

(73) Assignee: Fortinet, Inc., Sunnyvale, CA (US)

( * ) Notice: Subject to any disclaimer, the term of this patent is extended or adjusted under 35 U.S.C. 154(b) by 356 days.

(21) Appl. No.: 16/709,331

(22) Filed: Dec. 10, 2019

(65) Prior Publication Data
US 2021/0176261 A1 Jun. 10, 2021

(51) Int. Cl.
| | | |
|---|---|---|
| *H04L 9/40* | (2022.01) | |
| *G06K 9/62* | (2022.01) | |
| *G06N 20/00* | (2019.01) | |

(52) U.S. Cl.
CPC ........ *H04L 63/1416* (2013.01); *G06K 9/6267* (2013.01); *G06N 20/00* (2019.01); *H04L 63/1433* (2013.01)

(58) Field of Classification Search
CPC . H04L 63/1416; H04L 63/1433; G06N 20/00; G06K 9/6267
See application file for complete search history.

(56) References Cited

U.S. PATENT DOCUMENTS

| | | | | |
|---|---|---|---|---|
| 8,125,898 | B1 * | 2/2012 | Strayer | H04L 63/1416 |
| | | | | 709/224 |
| 10,320,813 | B1 * | 6/2019 | Ahmed | H04L 63/1441 |
| 10,417,415 | B2 * | 9/2019 | Abbaszadeh | G06N 20/00 |
| 10,747,606 | B1 * | 8/2020 | Shemer | G06Q 10/0635 |
| 10,938,853 | B1 * | 3/2021 | Zablocki | H04L 63/1458 |
| 2003/0154399 | A1 * | 8/2003 | Zuk | H04L 63/1416 |
| | | | | 726/11 |
| 2017/0026391 | A1 * | 1/2017 | Abu-Nimeh | G06F 16/24578 |
| 2019/0129705 | A1 * | 5/2019 | Bulut | G06F 21/50 |
| 2019/0188390 | A1 * | 6/2019 | Gunn | G06F 21/577 |

(Continued)

FOREIGN PATENT DOCUMENTS

| | | | | |
|---|---|---|---|---|
| CN | 113079127 A | * | 7/2021 | |
| EP | 3369231 B1 | * | 1/2020 | G06F 21/566 |

*Primary Examiner* — Sarah Su
(74) *Attorney, Agent, or Firm* — HDC Intellectual Property Law, LLP

(57) ABSTRACT

Systems and methods for performing multi-feed classification of security events to facilitate automated IR orchestration are provided. According to one embodiment a cloud-based security service protecting a private network provides a plurality of data feeds, wherein each data feed of the plurality of data feeds independently classify a given security event and produce a classification result. In response to an event associated with a process of an endpoint device that is part of the private network an endpoint protection platform running on the endpoint device performs an initial classification of the event and transmits the classification result to the cloud-based security service for final classification to facilitate causing, by the cloud-based security service, the endpoint protection platform to perform an automated incident response, by providing an output of an automated response engine of the cloud-based security service to the endpoint protection platform.

20 Claims, 6 Drawing Sheets

(56) References Cited

U.S. PATENT DOCUMENTS

| | | | |
|---|---|---|---|
| 2020/0293944 A1* | 9/2020 | Furukawa | G06N 20/00 |
| 2021/0176264 A1* | 6/2021 | Yavo | G06N 20/00 |
| 2021/0200859 A1* | 7/2021 | Yavo | G06F 21/53 |
| 2021/0200870 A1* | 7/2021 | Yavo | G06F 21/566 |
| 2021/0279184 A1* | 9/2021 | Yavo | G06F 12/1483 |

* cited by examiner

CLOUD-BASED ORCHESTRATION OF INCIDENT RESPONSE USING MULTI-FEED SECURITY EVENT CLASSIFICATIONS WITH MACHINE LEARNING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2019, Fortinet, Inc.

BACKGROUND

Field

Embodiments of the present invention generally relate to network security and classification of security events. In particular, embodiments of the present invention relate to an efficient technique for classifying security events based on joining multiple data feeds pertaining to the security event to enable initiation of an automated response based on the multi-feed classification.

Description of the Related Art

One of the challenges of building effective automated incident response solutions is to accurately classify security events/incidents/alerts and handle them correctly with minimal response time. Normally, classification is done by merging multiple data feeds (or classification sources) and generating a final classification based on a set of predefined rules. Such rule-based classification approaches that join data from multiple classification sources have a number of limitations. For example, they require per-data feed normalization that is specific to the type of data feed to allow the rule engine to use the feed-specific results, which requires additional work and research. Furthermore, as the amount of data feeds increases, the accuracy of a rule-based classification becomes complex, time-consuming and inaccurate.

Therefore, there is a need in the art for multi-feed classification-based response generation technique that facilitate automated response with enhanced accuracy and minimal research and development work.

SUMMARY

Systems and methods are described for performing multi-feed classification of security events to facilitate automated incident response (IR) orchestration. According to one embodiment, a cloud-based security service protecting a private network, provides multiple data feeds for classification of security events that may be observed on an endpoint device that is part of a private network. In response to detecting an event associated with a process executing on the endpoint device, an endpoint protection platform running on the endpoint device performs an initial classification of the event. Responsive to the initial classification, the endpoint protection platform transmits the initial classification and contextual information regarding the process and the event to the cloud-based security service. In one embodiment, the contextual information includes one or more of command line information associated with the execution of the process, a process execution chain, a memory dump associated with the process, information indicative of an application with which the process is associated, information identifying the user, environment variables associated with the process and the like. The cloud-based security service collects various classification results for the event from multiple data feeds implemented within the cloud-based security service. Based on the classification results obtained from the multiple data feeds and the initial classification, the cloud-based security service makes use of a machine-learning classifier to generate a final classification result. Finally, the cloud-based security service causes the endpoint protection platform to perform an automated incident response by providing an output of an automated response engine of the cloud-based security service to the endpoint protection platform.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
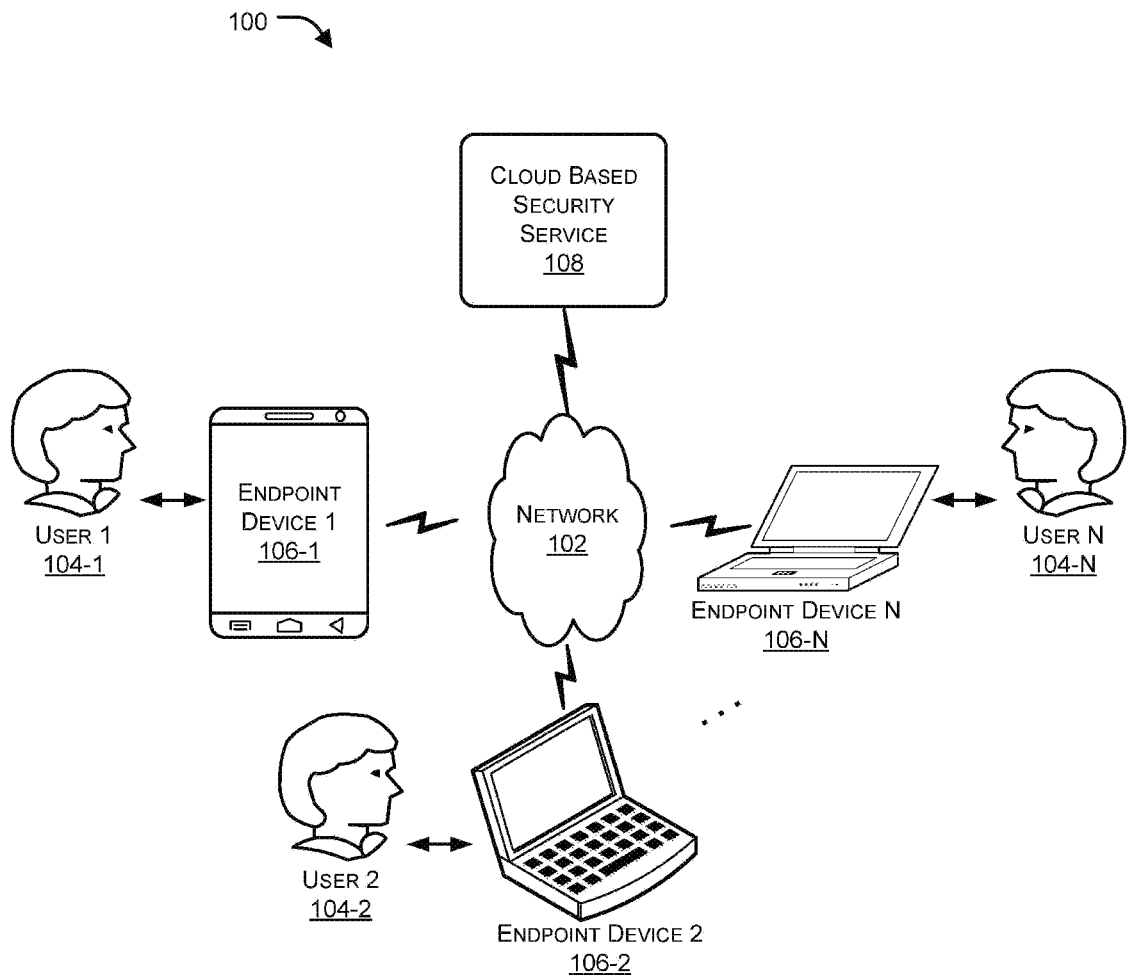
FIGS. 1A-B illustrate network architectures in which aspects of the present invention can be implemented in accordance with an embodiment of the present invention.

Systems and methods are described for determining whether an event, classified as a suspicious event is a malicious or safe event by analyzing various data feeds associated with the suspicious event. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "data feed" generally refers to a security event classification source. Non-limiting examples of data feeds include various types of endpoint protection platforms, antivirus engines, static malware analysis engines, dynamic malware analysis engines, memory forensic engines, sandboxes, User and Entity Behavior Analytics (UEBA), Intrusion Detection Systems (IDSs), content inspection engines, distributed denial of service (DDoS) mitigation engines, machine-learning classifiers, file threat-feeds, Internet Protocol (IP)/uniform resource locator (URL) threat feeds, Indicators of compromise (IOC) threat feeds, file reputation services, IP/URL reputation services, vulnerability discovery services, Tactics Techniques and Procedures (TTPs) feeds, security events collected from another private network, EDR data, and the like.

The phrase "endpoint protection platform" generally refers to cybersecurity monitoring and/or protection functionality implemented on an endpoint device. In one embodiment, the endpoint protection platform can be deployed in the cloud or on-premises and supports multi-tenancy. The endpoint protection platform may include a kernel-level Next Generation AntiVirus (NGAV) engine with machine learning features that prevent infection from known and unknown threats and may leverage code-tracing technology to detect advanced threats such as in-memory malware. The endpoint protection platform may be deployed on the endpoint device in the form of a lightweight endpoint agent that utilizes less than one percent of CPU and less than 100 MB of RAM and may leverage, among other things, various security event classification sources provided within an associated cloud-based security service. Non-limiting examples of an endpoint protection platform include the Software as a Service (SaaS) enSilo Endpoint Security Platform and the FORTICLIENT integrated endpoint protection platform available from Fortinet, Inc. of Sunnyvale, Calif.

The term "event" generally refers to an action or behavior of a process running on an endpoint device. Non-limiting examples of events include filesystem events and operating system events. Events that may be initially classified as suspicious or malicious by a heuristic engine and/or a machine-learning engine employed by the endpoint protection platform, for example, may include an attempt to communication with a critical software vulnerability (CVE), an attempt to access the registry of the operating system, the network or the file system, an attempt by the process to copy itself into another process or program (in other words, a classic computer virus), an attempt to write directly to the disk of the endpoint device, an attempt remain resident in memory after the process has finished executing, an attempt to decrypt itself when run (a method often used by malware to avoid signature scanners), an attempt to binds to a TCP/IP port and listen for instructions over a network connection (this is pretty much what a bot—also sometimes called drones or zombies—do), an attempt to manipulate (copy, delete, modify, rename, replace and so forth) files that are associated with the operating system, an attempt to read the memory of sensitive programs, an attempt to hook keyboard or mouse (AKA keylogging), an attempt capture a screen shot, an attempt to record sounds, and/or other behaviors or actions that may be similar to processes or programs known to be malicious. In one embodiment, events may be detected or intercepted by the endpoint protection platform hooking filesystem and/or operating system application programming interface (API) calls of interest and/or by leveraging a hypervisor to monitor the operating system.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrases "network security device" or "security device" generally refer to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, anti-spam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like. According to one embodiment, a management appliance associated with an enterprise network that manages the network security devices associated with the enterprise network incorporates the SDWAN controller functionality described herein and the network security devices operate as edge devices and/or hub devices in accordance with roles assigned to them by the management appliance.

The term "remediation" generally refers to addressing changes made to a computer system as a result of malicious activity. For example, remediation may involve removing threats form an infected system and reversing system changes made by a malicious process. The remediation may be performed automatically or manually or a combination thereof. Remediation may involve installation of an update, a patch or a bug fix to address a vulnerability exploited by the malicious process and/or removing a "backdoor" (e.g., in the form of a new user account) created by the malicious process. Remediation may also involve removal of malicious files, termination of malicious processes, deletion and/or modification of registry keys in order to restore the system to its pre-infected stated. In one embodiment, remediation also involves providing a single alert to the end user or administrator notifying that the malware has been stopped and allowing security teams to conduct forensics and threat hunting on their own time. According to one embodiment, endpoint remediation may be facilitated by providing the endpoint protection platform with information regarding a Representational State Transfer (REST) API through which one or more remediation tools are accessible.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described with reference to particular embodiments, it will be clear that the invention is not limited to these embodiments. Numerous modifications, changes, variations, substitutions, and equivalents will be apparent to those skilled in the art, without departing from the spirit and scope of the invention, as described in the claims.

According to one embodiment, a cloud-based security service protecting a private network, provides multiple data feeds, which will be described in further detail below. The data feeds may be used individually and/or in combination to facilitate automated classification of suspicious events observed at an endpoint device (e.g., a communication device or other computing device) that is part of the protected private network. The classification result can be based on independent or individual classification results of the multiple data feeds or combinations thereof. Each data feed generally represents a security event classification source. Non-limiting examples of data feeds include file threat-feeds, Internet Protocol (IP)/uniform resource locator (URL) threat feeds, Indicators of Compromise (IoC) threat feeds, file reputation services, IP/URL reputation services, vulnerability discovery services, Tactics Techniques and Procedures (TTPs) feeds, a security event collected from another private network, Endpoint Detection and Response (EDR) data, and the like.

In one embodiment, responsive to an occurrence of an event associated with a process of an endpoint device, an endpoint protection platform running on the endpoint device performs an initial classification of the event. In response to the initial classification, the endpoint protection platform transmits the initial classification and contextual information regarding the process and the event to the cloud-based security service. The contextual information may include, for example, a combination of a command line instruction and associated parameters that were used to execute the process, a process execution chain, a memory dump associated with the process, and the like. Based on the information received from the endpoint protection platform, the cloud-based security service may collect additional classification results for the event from one or more of the data feeds implemented by the cloud-based security service. The data feeds may independently produce classification results for the event. Non-limiting examples of a classification result include classifying the event as a malicious event, an inconclusive event a suspicious event, a potentially unwanted program (PUP), a likely safe event or a safe event. A final classification result can be generated by the cloud-based security service by applying a machine-learning classifier to the initial classification and the classification results obtained from the data feeds. This final classification may then be used to determine and cause an automated incident response to be performed by the endpoint protection platform. The automated incident response may be any or a combination of notifying the end user of the endpoint device regarding the event, notifying a network administrator regarding the event, opening a ticket, isolating the endpoint device, quarantining the file associated with the process, terminating a process, remove and/or restore registry value, removing a file, and remediating the endpoint device. According to one embodiment, an automated incident response engine implemented within the cloud-based security service orchestrates incident response operations using tailor made playbooks based on the final classification of the security event. According to one embodiment, an automated incident response engine implemented within the cloud-based security service orchestrates incident response operations using tailor made playbooks based on the final classification of the security event.

FIG. 1A illustrates a network architecture 100 in which aspects of the present invention can be implemented in accordance with an embodiment of the present invention. In the context of network architecture 100, a cloud-based security service 108, protecting a private network 102 is accessible to endpoint devices 106-1 . . . 106-N of the private network 102 (which may simply be referred to as network 102 herein). The cloud-based security service 108 may be implemented within a public cloud, a private cloud or a hybrid cloud. Non-limiting examples of a cloud-based security service include the enSilo Cloud Service and FORTIGUARD security services available from the assignee of the present invention.

The endpoint devices 106-1, 106-2, 106-3 . . . 106-N (which may be collectively referred to as endpoint devices 106, and may be individually referred to as endpoint device 106 herein) associated with network 102 may include, but are not limited to, personal computers, smart devices, web-enabled devices, hand-held devices, laptops, mobile devices, and the like. In one embodiment, cloud-based security service 106 may interact with users 104-1, 104-2 . . . 104-N (which may be collectively referred to as users 104, and may be individually referred to as a user 104 herein) through network 102 via their respective endpoint devices 106, for example, in the form of notifications or alerts regarding security events via a user interface associated with the endpoint protection platform.

Those skilled in the art will appreciate that, network 102 can be a wireless network, a wired network or a combination thereof that can be implemented as one of the various types of networks, such as an Intranet, a Local Area Network (LAN), a Wide Area Network (WAN), the Internet, and the like. Further, network 102 can either be a dedicated network or a shared network. A shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

As described in further detail below, the cloud-based security service 108 can provide multiple data feeds for processing information relating to a security event observed at an endpoint device 106. Each data feed may independently produce a classification result for the security event to provide multiple data points for a machine-learning classifier.

In response to occurrence of an event associated with a process running on an endpoint device 106, an endpoint protection platform running on endpoint device 106 can perform an initial local classification of the event. In response to the initial classification, the endpoint protection platform may transmit the initial classifications and contextual information regarding the process and the event to cloud-based security service 108 for reclassification. The contextual information may include, for example, a combination of a command line information, a process execution chain, a memory dump associated with the process, and the like.

Responsive to receipt of the request for event classification from the endpoint protection platform, cloud-based security service 108 may collect various classification results for the event from multiple data feeds by directing each of the multiple data feeds to produce a classification result for the event based on the contextual information received from the endpoint protection platform. Cloud-based security service 108 may further generate a final classification result for the event by applying a machine-learning classifier to the initial classification and the various classification results of the multiple data feeds.

Finally, cloud-based security service 108 may cause the endpoint protection platform to perform an automated incident response by providing an output of an automated response engine derived based on the final classification of the event to the endpoint protection platform. The automated incident response may direct the endpoint protection platform to notifying the end user of the endpoint device 106, open a ticket relating to the event, isolate the endpoint device 106, quarantine the file at issue and/or remediate endpoint device 106.

Figure 1B:
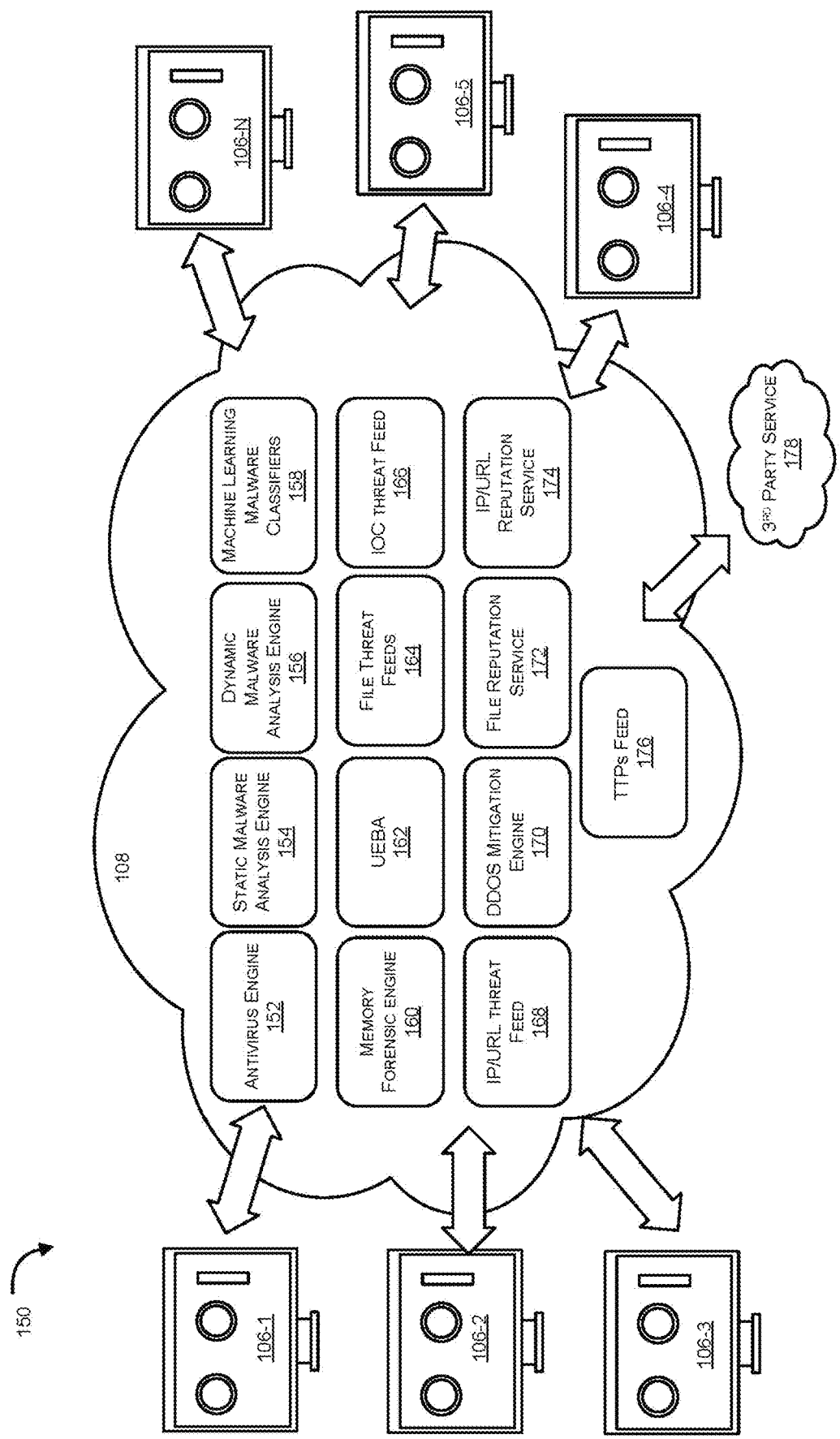

FIG. 1B illustrates a cloud-based network architecture 150 in which aspects of the present invention can be implemented in accordance with an embodiment of the present invention. In the context of the present example, cloud-based security service 108 implements multiple data feeds 152-176 that are each capable of contributing in whole or in part to a classification result for a given security event. In one embodiment, some data feeds 152-176 may be limited to classifying one or more specific artifacts of a given security event, while others may be capable of independently classifying a given security event and producing a classification result. For example, a hash feed that generates a hash of a file associated with an event may be capable of classifying the file and an IP or URL feed (e.g., IP/URL threat feed 168 and IP/URL reputation service 174) may be capable of classifying an IP address or a URL associated with an event.

Cloud-based security service 108 can be used for augmenting or reclassifying an initial classification of an event made by an endpoint protection platform protecting the endpoint device on which the process that produced the event is running. Further, in some embodiment, the cloud-based security service may determine (based on a final classification of the event) an action determined by an automated incident response engine and cause the endpoint protection platform to perform the action.

Non-limiting examples of data feeds that may be used depending upon the particular implementation include various types of endpoint protection platforms (e.g., running on other endpoint devices 106), an antivirus engine 152, a static malware analysis engine 154, a dynamic malware analysis engine 156 (e.g., a sandbox), machine-learning classifiers 158, a memory forensic engine 160, User and Entity Behavior Analytics (UEBA) 162, file threat-feeds 164, an IoC threat feeds 166, an IP/URL threat feed 168, a distributed denial of service (DDoS) mitigation engine 170, a file reputation service 172, an IP/URL reputation service 174, a TTPs feed 176, third party network services 178, and the like.

While existing rule-based classification approaches that attempt to join multiple classification sources require per-data feed normalization to allow the rule engine to use the feed-specific results, no such normalization is required in accordance with embodiments described herein as the machine-learning classification model can simply be trained to perform a final classification based on the native outputs of the multiple data feeds employed. In order to avoid feed-specific normalization the result of each feed is used as input to the learning algorithm in its native form. A result can be a number, for example a score from 0-100, and/or a text representing classification, for example "Good", "Bad", "Unknown". In the case of text, a numeric representation may be used that can be generated using a text to number algorithm, such as a checksum. The result of each feed is then used as a feature for the learning algorithm and thus the feature vector is created from the result provided by the different feeds. For learning, a combination of supervised or unsupervised learning can be used. For example, it is possible to use a labeled data set as the base for learning. To add a new feed all that is needed is to expand the feature vector with the results from the new feed and train a new model with the new data. As those skilled in the art will appreciate, avoiding the increasing complexity resulting from adding new data feeds and avoiding the feed specific normalization of each data feed has the effect of reducing the demand on computing resources of the cloud-based service 108 while retaining both throughput and classification accuracy and while also reducing the research and development overhead that is needed to add a new feed.

Figure 2:
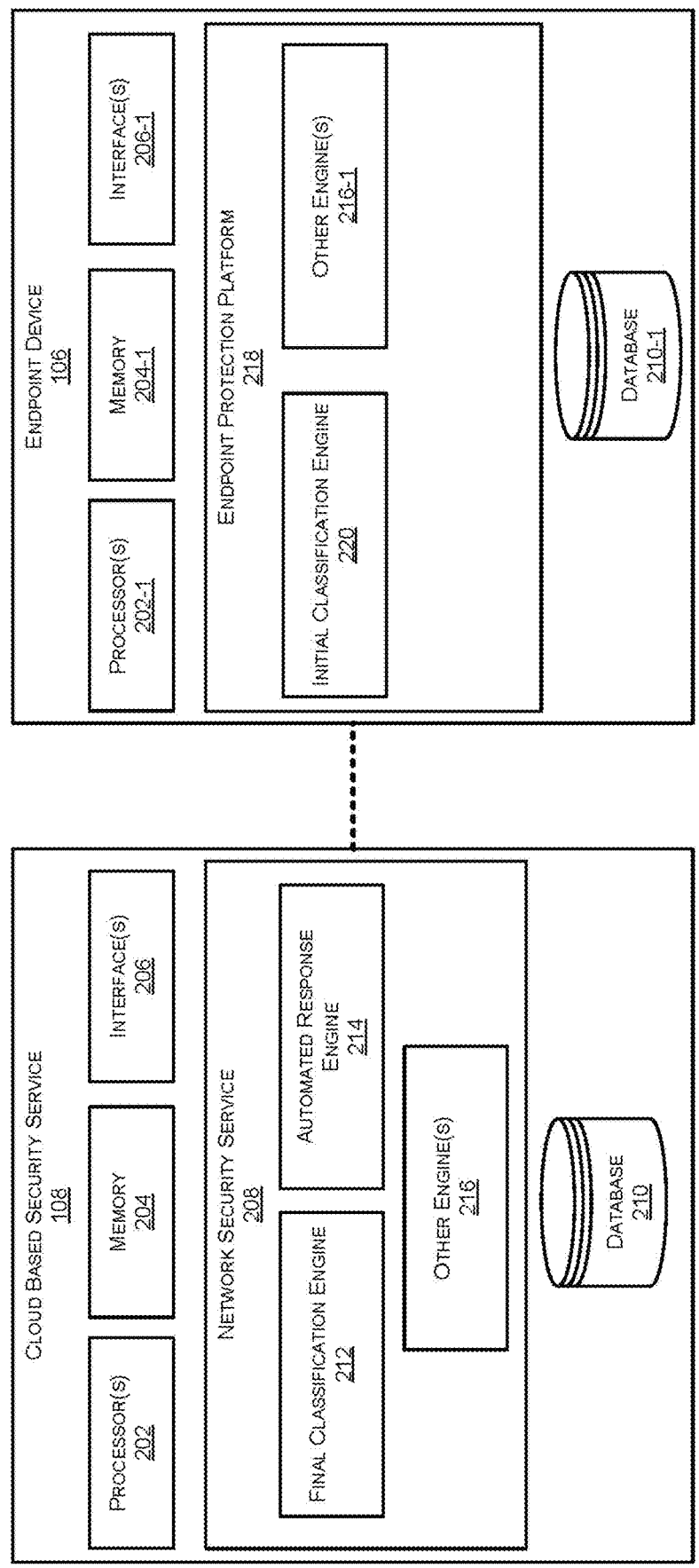
FIG. 2 is a block diagram illustrating functional components of a system in accordance with an embodiment of the present invention.

FIG. 2 is a block diagram illustrating functional components of a system in accordance with an embodiment of the present invention. In the context of the present example, an endpoint device 106, which may represent a computing device associated with a subscriber to cloud-based security service 108, can include one or more processor(s) 202-1. Processor(s) 202-1 can be implemented as one or more microprocessors, microcomputers, microcontrollers, digital signal processors, central processing units, logic circuitries, and/or any devices that manipulate data based on operational instructions. Among other capabilities, processor(s) 202-1 are configured to fetch and execute computer-readable instructions stored in a memory 204-1 of endpoint device 106. Memory 204-1 can store one or more computer-readable instructions or routines, which may be fetched and executed to create or share the data units over a network service. Memory 204-1 can include any non-transitory storage device including, for example, volatile memory such as RAM, or non-volatile memory such as EPROM, flash memory, and the like. In an example embodiment, memory 204-1 may be a local memory or may be located remotely, such as a server, a file server, a data server, and the Cloud.

Endpoint device 106 can also include one or more interface(s) 206-1. Interface(s) 206-1 may include a variety of interfaces, for example, interfaces for data input and output devices, referred to as I/O devices, storage devices, and the like. Interface(s) 206-1 may facilitate communication of endpoint device 106 with various devices coupled to endpoint device 106. Interface(s) 206-1 may also provide a communication pathway for one or more components of endpoint device 106. Examples of such components include, but are not limited to, endpoint protection platform 218 and data 210-1.

Endpoint protection platform 218 can be implemented as a combination of hardware and software or firmware programming (for example, programmable instructions) to implement one or more functionalities of engine(s) 208. In the examples described herein, such combinations of hardware and software or firmware programming may be implemented in several different ways. For example, the programming for the engine(s) may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s) 208. In such examples, endpoint device 106 can include the machine-readable storage medium storing the instructions and the processing resource to execute the instructions, or the machine-readable storage medium may be separate but accessible to endpoint device 106 and the processing resource. In other examples, endpoint protection platform 218 may be implemented by electronic circuitry. Data 210-1 can include data that is either stored or generated as a result of functionalities implemented by any of the components of endpoint protection platform 218.

In an example, endpoint protection platform 218 can include an initial classification engine 220 and other engine(s) 216-1. Other engine(s) 216-1 can implement functionalities that supplement applications or functions performed by endpoint device 106 or endpoint protection platform 218.

According to an embodiment, in response to an event associated with a process of the endpoint device, initial classification engine 220 is configured to perform an initial, local classification of the event. Further, in response to the initial classification, initial classification engine 220 configured to transmit the initial classification and contextual information associated with the process and event to cloud-based security service 108. The contextual information includes any or a combination of a command line instruction to execute the process, a process execution chain, and a memory dump associated with the process. Cloud based security service 108 can collect various classification results for the event by obtaining the classification result for the event from each of the multiple feeds. The various classification result is any of a malicious event, a suspicious event, a potentially unwanted program (PUP) event, an inconclusive event, a likely safe event and a safe event.

In an embodiment, examples of data feeds include a file threat-feeds, Internet Protocol (IP)/uniform resource locator (URL) threat feeds, Indicators of compromise (IoC) threat feeds, file reputation services, an IP/URL reputation services, a vulnerability discovery services, Tactics Techniques and Procedures (TTPs) feed, a security event collected from other private network and Endpoint Detection and Response (EDR) data, and the like.

In an embodiment, initial classification engine 220 further configured to assigning a criticality score to the event based on the initial classification of the event for example, a high criticality score classifies the severe threat and a low criticality score classifies a less severe threat.

As illustrated, cloud-based security service 108, which may represent a cloud switch of a cloud service, can include one or more processor(s) 202. Processor(s) 202 can be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 204 of cloud-based security service 108. Memory 204 can store one or more computer-readable instructions or routines, which may be fetched and executed to create or share the data units over a network service. Memory 204 can include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and the Cloud.

Cloud-based security service 108 can also include one or more interface(s) 206. Interface(s) 206 may include a variety of interfaces, for example, interfaces for data input and output devices, referred to as I/O devices, storage devices, and the like. Interface(s) 206 may facilitate communication of cloud-based security service 108 with various devices coupled to cloud-based security service 108. Interface(s) 206 may also provide a communication pathway for one or more components of cloud-based security service 108. Examples of such components include, but are not limited to, network security service 208 and data 210.

Network security service 208 can be implemented as a combination of hardware and software or firmware programming (for example, programmable instructions) to implement one or more functionalities of engine(s) 208. In the examples described herein, such combinations of hardware and software or firmware programming may be implemented in several different ways. For example, the programming for the engine(s) may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s) 208. In such examples, cloud-based security service 108 can include the machine-readable storage medium storing the instructions and the processing resource to execute the instructions, or the machine-readable storage medium may be separate but accessible to cloud-based security service 108 and the processing resource. In other examples, network security service 208 may be implemented by electronic circuitry. Data 210 can include data that is either stored or generated as a result of functionalities implemented by any of the components of network security service 208.

In an example, network security service 208 can include a final classification engine 212, an automated response engine 214, and other engine(s) 216. Other engine(s) 216 can implement functionalities that supplement applications or functions performed by cloud-based security service 108 or network security service 208.

In an embodiment, the final classification engine 212 configured to collect various results for the event by obtaining the classification result for the event from each of the multiple feeds. The various classification results may classify the event as any of a malicious event, a suspicious event, a potentially unwanted program (PUP) event, an inconclusive event, a likely safe event and a safe event. In one embodiment, the final classification engine 212 is configured to generate a final classification result by applying a machine-learning classifier to the initial classification and the various classification results obtained from one or more data feeds. Non-limiting examples of the machine learning model used by the machine-learning classifier include linear regression, logistic regression, decision tree, random forest, artificial neural network (ANN) and deep neural network (DNN). In an embodiment, automated response generation engine 214 configured to generate one or more actions associated with an automated response based on the final classification. Automated response generation engine 214 can cause the endpoint protection platform to perform the one or more actions associated with the automated incident response by providing an output of an automated response engine of the cloud-based security service to the endpoint protection platform. The one or more actions may be any or a combination of notifying the end user of the endpoint device 106, opening a ticket regarding the event, isolating the endpoint device 106, quarantining the file associated with the event, and remediating the endpoint device 106.

Figure 3:
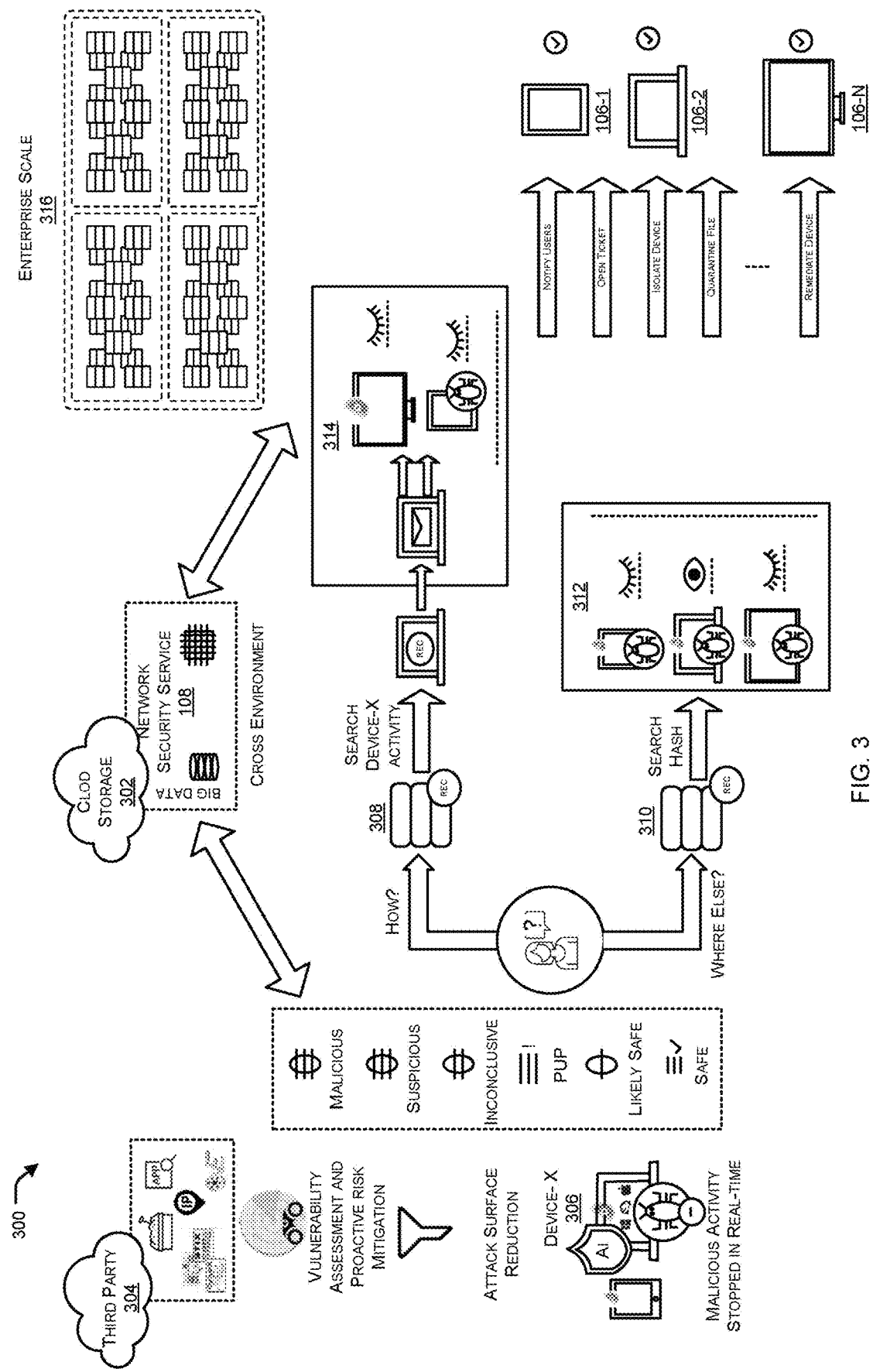
FIG. 3 illustrates an example high-level workflow relating to real-time automated endpoint security with orchestrated incident response in accordance with an embodiment of the present invention.

FIG. 3 illustrates an example high-level workflow relating to real-time automated endpoint security with orchestrated incident response in accordance with an embodiment of the present invention. In the context of the present example 300, network security service 108 is a cloud-based security service protecting one or more enterprise networks. In one embodiment, the cloud-based security service 108 supports multi-tenancy features and management of security agents at enterprises scale 316, thereby facilitating service of multiple customers by managed security service providers (MSSPs), for example. Cloud storage 302 can be operatively coupled to network security service 108.

In an embodiment, responsive to observation of an event on a device 306 that is a part of a private network protected by the network security service, the endpoint protection platform running on device 306 may detect and/or block malicious activity associated with the threat in real-time by performing pre-execution processing, including classifying the event as a malicious event, a suspicious event, a potentially unwanted program (PUP), an inconclusive event, a likely safe event or a safe event. This initial classification may be made based on a combination of internal analysis and based on the use of real-time third-party data from a third party 304.

Regardless of the manner in which the initial classification is made, after making this initial classification, the endpoint protection platform may provide contextual information regarding the detected event and the process with which the event is associated as well as its initial classification to the network security service 108 to receive direction with respect to how to respond to the event. In the context of the present example, based on the contextual information provided, network security service 108 analyzes the activity of device 306 at 308, and may also search a hash associated with the file at issue at 310 to determine where else the threat may have propagated within the private network. Furthermore, based on the final classification of the event, network security service 108 facilitates taking automated incident responses at affected devices 312 and 314. The various automated incident responses may follow tailor made playbooks based on the final classification of the security event and may include any or a combination of notifying the user, opening a ticket, isolating the device, quarantining the file and remediating the endpoint device 106.

Figure 4:
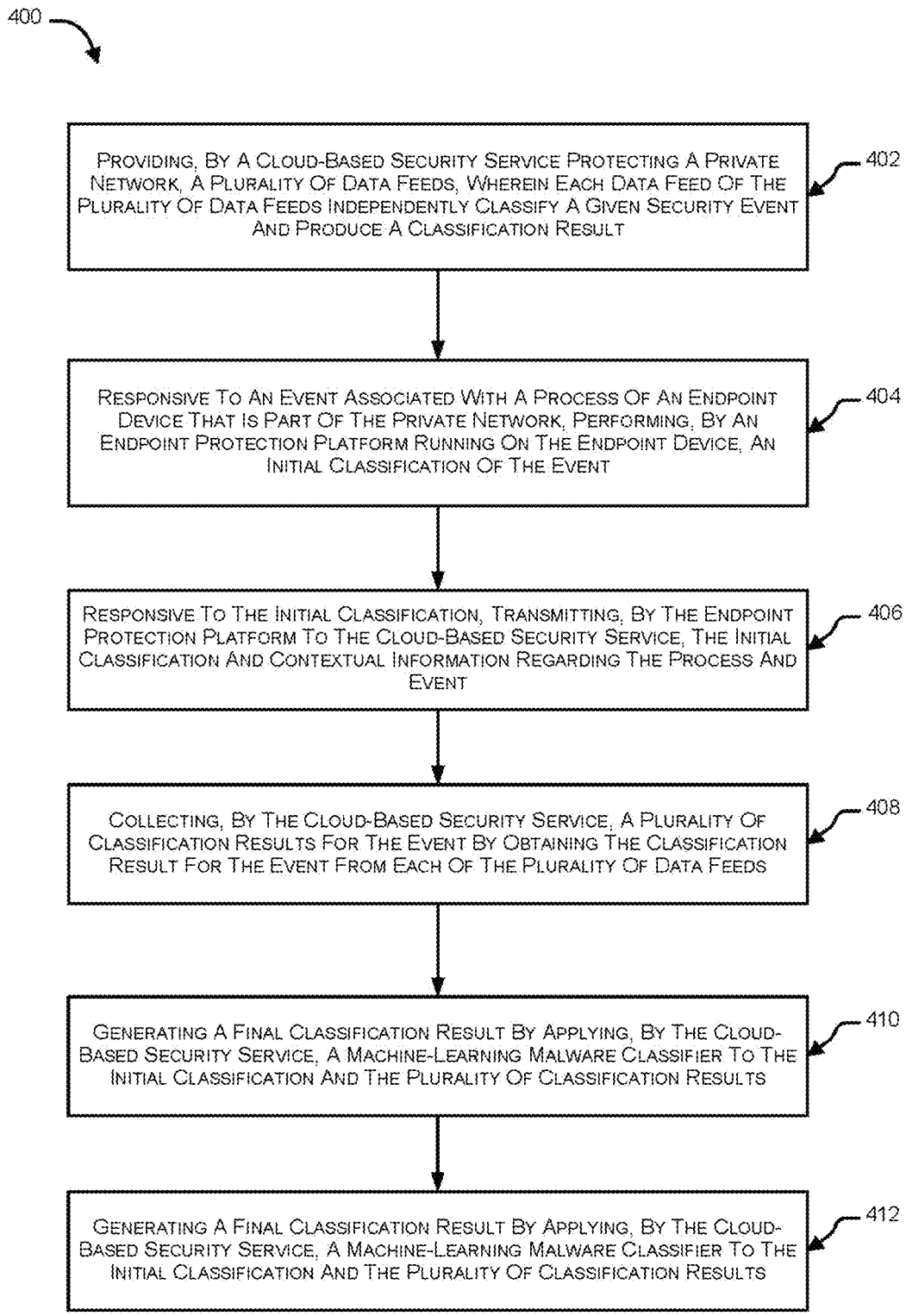
FIG. 4 is a flow diagram illustrating an automated incident response processing in accordance with an embodiment of the present invention.

FIG. 4 is a flow diagram 400 illustrating an automated incident response processing in accordance with an embodiment of the present invention. The processing described with reference to FIG. 4 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by a combination of one or more computer systems in physical or virtual form, such as computer system 500 described with reference to FIG. 5.

At block 402, a cloud-based security service protecting a private network provides multiple data feeds, each of which is configured to independently classify a security event and produce a classification result.

At block 404, responsive to detection of an event associated with a process executing or attempted to be executed on an endpoint device, an endpoint protection platform running on an endpoint device performs an initial classification of the event. Depending upon the particular implementation, this initial classification may be machine-learning based, heuristics-based or a combination thereof.

At block 406, responsive to the initial classification, the endpoint protection platform leverages additional knowledge and power provided by the cloud-based service by transmitting the initial classification and contextual information regarding the process and event to the cloud-based service. As noted above, the contextual information may include, for example, a combination of a command line instruction and associated parameters that were used to execute the process, a process execution chain, a memory dump associated with the process, and the like.

At block 408, the cloud-based security service collects multiple classification results for the event by directing multiple data feeds to each independently classify the event at issue based on the contextual information.

At block 410, the cloud-based security service generates a final classification result for the event at issue by applying a machine-learning classifier to the initial classification and the multiple classification results obtained from the multiple data feeds.

At block 412, based on the final classification, the cloud-based security service, causes the endpoint protection platform to perform an automated incident response, by providing an output of an automated response engine of the cloud-based security service to the endpoint protection platform. In one embodiment, the automated incident response engine orchestrates incident response operations (e.g., notifying the end user of the endpoint device 160, opening a ticket relating to the event, isolating the endpoint device 106, quarantining the file at issue and/or remediating the endpoint device 106) using tailor made playbooks based on the final classification of the security event.

Figure 5:
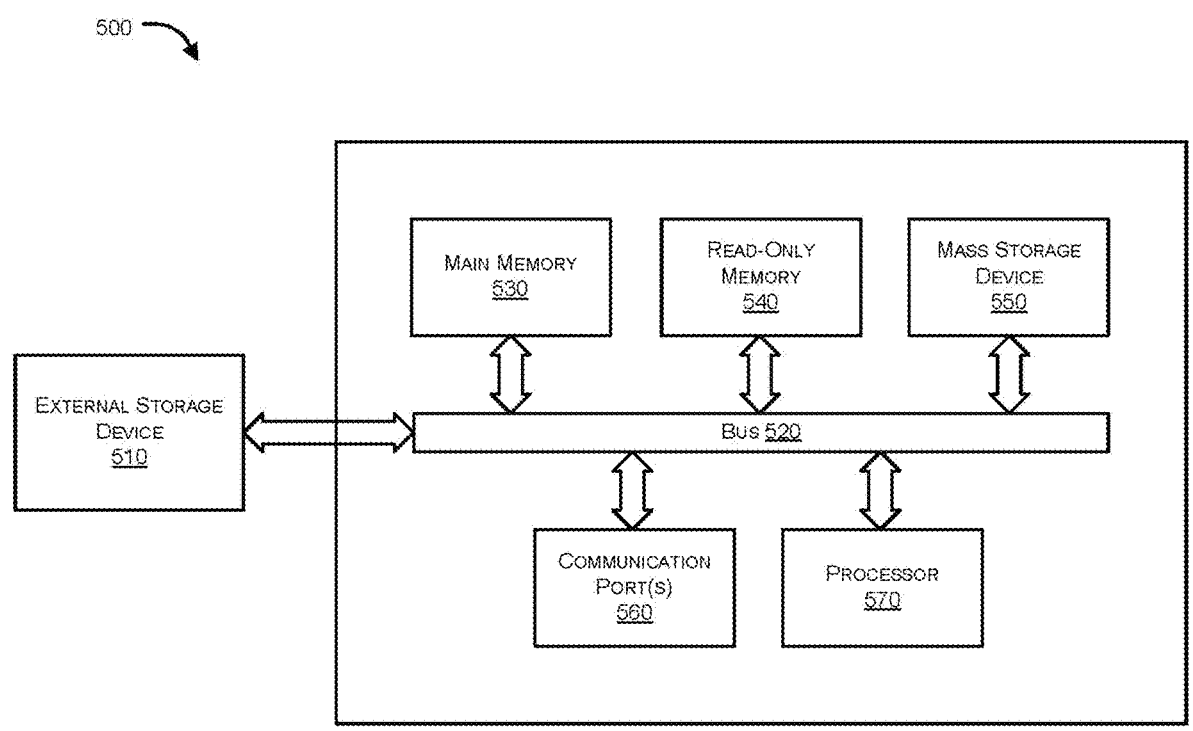
FIG. 5 illustrates an exemplary computer system in which or with which embodiments of the present invention may be utilized.

FIG. 5 illustrates an exemplary computer system 500 in which or with which embodiments of the present invention may be utilized. For example, computer system 500 may represent an endpoint device (e.g., endpoint device 106) or a server within a cloud-based security service (e.g., cloud-based security service 108). While various examples described herein are described with reference to physical computer systems, those skilled in the art will appreciate the functionality and methodologies described herein are equally applicable to computing environments (e.g., a data center or cloud) in which functionality is deployed on virtual machines or as a service in the context of a container, a pod, or other virtualized environment. Furthermore, while in some embodiments, the various data feeds discussed herein have been described with reference to various security event classification services, it is to be appreciated that one or more of the various security event classification sources may be network security devices represented in virtual or physical form.

As shown in FIG. 5, computer system 500 includes an external storage device 510, a bus 520, a main memory 530, a read only memory 540, a mass storage device 550, a communication port 560, and a processor 570.

Those skilled in the art will appreciate that computer system 500 may include more than one processor 570 and communication ports 560. Examples of processor 570 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 570 may include various modules associated with embodiments of the present invention.

Communication port 560 can be any of an RS-232 port for use with a modem based dialup connection, a 10/100 Ethernet port, a Gigabit or 10 Gigabit port using copper or fiber, a serial port, a parallel port, or other existing or future ports. Communication port 560 may be chosen depending on a network, such a Local Area Network (LAN), Wide Area Network (WAN), or any network to which computer system connects.

Memory 530 can be Random Access Memory (RAM), or any other dynamic storage device commonly known in the art. Read only memory 540 can be any static storage device(s) e.g., but not limited to, a Programmable Read Only Memory (PROM) chips for storing static information e.g. start-up or BIOS instructions for processor 570.

Mass storage 550 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 520 communicatively couples processor(s) 570 with the other memory, storage and communication blocks. Bus 520 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 570 to software system.

Optionally, operator and administrative interfaces, e.g. a display, keyboard, and a cursor control device, may also be coupled to bus 520 to support direct operator interaction with computer system. Other operator and administrative interfaces can be provided through network connections connected through communication port 560. External storage device 510 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
   providing, by a cloud-based security service protecting a private network, a plurality of data feeds, wherein each data feed of the plurality of data feeds independently classify a given security event and produce a classification result;
   responsive to an event associated with a process of an endpoint device that is part of the private network, performing, by an endpoint protection platform running on the endpoint device, an initial classification of the event;
   responsive to the initial classification, transmitting, by the endpoint protection platform to the cloud-based security service, the initial classification and contextual information regarding the process and event;
   collecting, by the cloud-based security service, a plurality of classification results for the event by obtaining the classification result for the event from each of the plurality of data feeds;
   generating a final classification result by applying, by the cloud-based security service, a machine-learning classifier to the initial classification and the plurality of classification results; and
   based on the final classification, causing, by the cloud-based security service, the endpoint protection platform to perform an automated incident response, by providing an output of an automated response engine of the cloud-based security service to the endpoint protection platform.

2. The method of claim 1, wherein the classification results obtained from the plurality of data feeds need not be normalized prior to being input to the machine-learning classifier.

3. The method of claim 1, wherein the output of the automated response engine comprises a set of automated incident responses based on a set of automated incident response playbooks and the final classification.

4. The method of claim 3, wherein the set of automated incident responses include one or more notifying an end user of the endpoint device, opening a ticket relating to the event, isolating the endpoint device, quarantining a file associated with the event, and remediating the endpoint device.

5. The method of claim 1, wherein each of the plurality of classification results classify the event as a malicious event, a suspicious event, a potentially unwanted program (PUP) event, an inconclusive event, a likely safe event or a safe event.

6. The method of claim 1, wherein the endpoint device is any or a combination of a communication device and a computing device.

7. The method of claim 1, wherein the plurality of data feeds include one or more of a file threat-feed, an Internet Protocol (IP)/uniform resource locator (URL) threat feed, an Indicators of Compromise (IoC) threat feed, a file reputation service, an IP/URL reputation service, a vulnerability discovery service, a Tactics Techniques and Procedures (TTPs) feed, a classification of a security event by a third-party network or another endpoint device and Endpoint Detection and Response (EDR) data.

8. The method of claim 1, wherein the contextual information includes command line information associated with execution of the process, an execution chain associated with the process, and a memory dump associated with the process.

9. The method of claim 1, wherein the method comprises assigning a criticality score based on the initial classification of the event.

10. The method of claim 1, wherein the final classification result classifies the event as a malicious event, a suspicious event, a potentially unwanted program (PUP) event, an inconclusive event, a likely safe event or a safe event.

11. A non-transitory computer-readable storage medium embodying a set of instructions, which when executed by one or more processing resources of a cloud-based security service protecting a private network, causes the one or more processing resources to perform a method comprising:
  receiving, from an endpoint protection platform running on an endpoint device associated with the private network, an initial classification of an event associated with a process of the endpoint device and contextual information regarding the process and the event;
  collecting a plurality of classification results for the event by obtaining the classification result for the event from each of a plurality of data feeds implemented within the cloud-based security service, wherein each data feed of the plurality of data feeds is configured to independently classify a given security event and produce a classification result;
  generating a final classification result by applying a machine-learning classifier implemented within the cloud-based security service to the initial classification and the plurality of classification results; and
  based on the final classification, causing, by the cloud-based security service, the endpoint protection platform to perform an automated incident response, by providing an output of an automated response engine of the cloud-based security service to the endpoint protection platform.

12. The non-transitory computer-readable storage medium of claim 11, wherein the classification results obtained from the plurality of data feeds need not be normalized prior to being input to the machine-learning classifier.

13. The non-transitory computer-readable storage medium of claim 11, wherein the output of the automated response engine comprises a set of automated incident responses based on a set of automated incident response playbooks and the final classification.

14. The non-transitory computer-readable storage medium of claim 13, wherein the set of automated incident responses include one or more notifying an end user of the endpoint device, opening a ticket relating to the event, isolating the endpoint device, quarantining a file associated with the event, and remediating the endpoint device.

15. The non-transitory computer-readable storage medium of claim 11, wherein each of the plurality of classification results classify the event as a malicious event, a suspicious event, a potentially unwanted program (PUP) event, an inconclusive event, a likely safe event or a safe event.

16. The non-transitory computer-readable storage medium of claim 11, wherein the endpoint device is any or a combination of a communication device and a computing device.

17. The non-transitory computer-readable storage medium of claim 11, wherein the plurality of data feeds include one or more of a file threat-feed, an Internet Protocol (IP)/uniform resource locator (URL) threat feed, an Indicators of Compromise (IoC) threat feed, a file reputation service, an IP/URL reputation service, a vulnerability discovery service, a Tactics Techniques and Procedures (TTPs) feed, a classification of a security event by a third-party network or another endpoint device and Endpoint Detection and Response (EDR) data.

18. The non-transitory computer-readable storage medium of claim 11, wherein the contextual information includes command line information associated with execution of the process, an execution chain associated with the process, and a memory dump associated with the process.

19. The non-transitory computer-readable storage medium of claim 11, wherein the method comprises assigning a criticality score based on the initial classification of the event.

20. The non-transitory computer-readable storage medium of claim 11, wherein the final classification result classifies the event as a malicious event, a suspicious event, a potentially unwanted program (PUP) event, an inconclusive event, a likely safe event or a safe event.

* * * * *